United States Patent
Liu

(10) Patent No.: US 12,425,832 B2
(45) Date of Patent: Sep. 23, 2025

(54) METHOD AND APPARATUS FOR TRANSMITTING INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 403 days.

(21) Appl. No.: 17/923,505

(22) PCT Filed: May 7, 2020

(86) PCT No.: PCT/CN2020/088998
§ 371 (c)(1),
(2) Date: Nov. 4, 2022

(87) PCT Pub. No.: WO2021/223163
PCT Pub. Date: Nov. 11, 2021

(65) Prior Publication Data
US 2023/0071926 A1 Mar. 9, 2023

(51) Int. Cl.
*H04W 72/04* (2023.01)
*H04W 8/08* (2009.01)

(52) U.S. Cl.
CPC .................................. *H04W 8/08* (2013.01)

(58) Field of Classification Search
None
See application file for complete search history.

(56) References Cited

U.S. PATENT DOCUMENTS

| | | | |
|---|---|---|---|
| 7,061,891 | B1 | 6/2006 | Kilfoyle et al. |
| 2016/0337990 | A1 | 11/2016 | Mitsui et al. |
| 2018/0007574 | A1 | 1/2018 | Park et al. |
| 2019/0373450 | A1 | 12/2019 | Zhou et al. |

FOREIGN PATENT DOCUMENTS

| | | |
|---|---|---|
| CN | 103546920 A | 1/2014 |
| CN | 110650473 A | 1/2020 |

OTHER PUBLICATIONS

Chinese Patent Application No. 202080000911.8, Office Action dated Apr. 2, 2022, 5 pages.
Chinese Patent Application No. 202080000911.8, English translation of Office Action dated Apr. 2, 2022, 7 pages.
European Patent Application No. 20934705.3, Search and Opinion dated Jan. 30, 2024, 11 pages.
Ericsson "Single Rx antenna capability and TBS limitation for unicast transmission" #GPP TSG-RAN WG2 #86, Tdoc R2-142541 May 2014, 6 pages.
PCT/CN2020/088998 International Search Report dated Jan. 26, 2021; 2 pages.
Indian Patent Application No. 202247069069, Office Action dated Jan. 24, 2023, 5 pages.

*Primary Examiner* — Willie J Daniel, Jr.
(74) *Attorney, Agent, or Firm* — Cozen O'Connor

(57) ABSTRACT

A method for transmitting information includes receiving reception capacity information reported by a user equipment (UE), and determining that the UE is a predetermined type of UE having a reception capacity lower than a capacity threshold according to the reception capacity information, and configuring an enhancement parameter for the predetermined type of UE, in which the enhancement parameter is configured to enhance downlink transmission transmitted to the UE.

19 Claims, 6 Drawing Sheets

METHOD AND APPARATUS FOR TRANSMITTING INFORMATION

CROSS REFERENCE TO RELATED APPLICATIONS

This application is the U.S. national phase application based on International Application No. PCT/CN2020/088998, filed May 7, 2020, the content of which is incorporated herein by reference for all purposes.

TECHNICAL FIELD

The disclosure relates to, but is not limited to, a field of wireless communication technologies, and more particularly to a method for transmitting information.

BACKGROUND

The 3rd Generation Partnership Project (3GPP) has carried out research on a Reduced Capacity NR Devices (REDCAP) project of a version of the standards documents (Release, R) 17. The goal is to reduce complexity of user equipment (UE) and save costs under a premise of coexistence with R15 or 16 UE.

SUMMARY

In view of this, the present disclosure provides a method for transmitting information.

According to a first aspect of embodiments of the present disclosure, there is provided a method for transmitting information, applicable for a first base station. The method includes:

receiving reception capacity information reported by a user equipment (UE); and determining that the UE is a predetermined type of UE having a reception capacity lower than a capacity threshold according to the reception capacity information, and configuring an enhancement parameter for the predetermined type of UE, in which the enhancement parameter is configured to enhance downlink transmission transmitted to the UE.

According to a second aspect of embodiments of the present disclosure, there is provided a method for transmitting information, applicable for a second base station. The method includes:

receiving an enhancement parameter transmitted by a first base station in response to handover of a user equipment (UE) from the first base station to the second base station; and enhancing downlink transmission transmitted to the UE according to the enhancement parameter.

According to a third aspect of embodiments of the present disclosure, there is provided a method for transmitting information, applicable for a user equipment (UE). The method includes:

reporting reception capacity information to a first base station, wherein the reception capacity information is configured for the first base station to configure an enhancement parameter for the UE, the enhancement parameter is configured for the first base station to enhance downlink transmission transmitted to the UE.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Illustrative embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following illustrative embodiments do not represent all implementations consistent with the present disclosure. Instead, they are merely examples of apparatuses and methods consistent with some aspects of the disclosure as described in the appended claims.

The terms in embodiments of the present disclosure are only for the purpose of describing specific embodiments, and are not intended to limit embodiments of the present disclosure. The singular forms of "a", "said" and "the" in embodiments of the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second and third may be used in embodiments of the present disclosure to describe various information, the information should not be limited to these terms. These terms are only used to distinguish the same type of information from each other. For example, without departing from the scope of the present disclosure, the first information may also be referred to as the second information, and similarly, the second information may also be referred to as the first information.

In different contexts, the term "if" used herein is interpreted as "when" or "upon" or "in response to determining".

Figure 1:
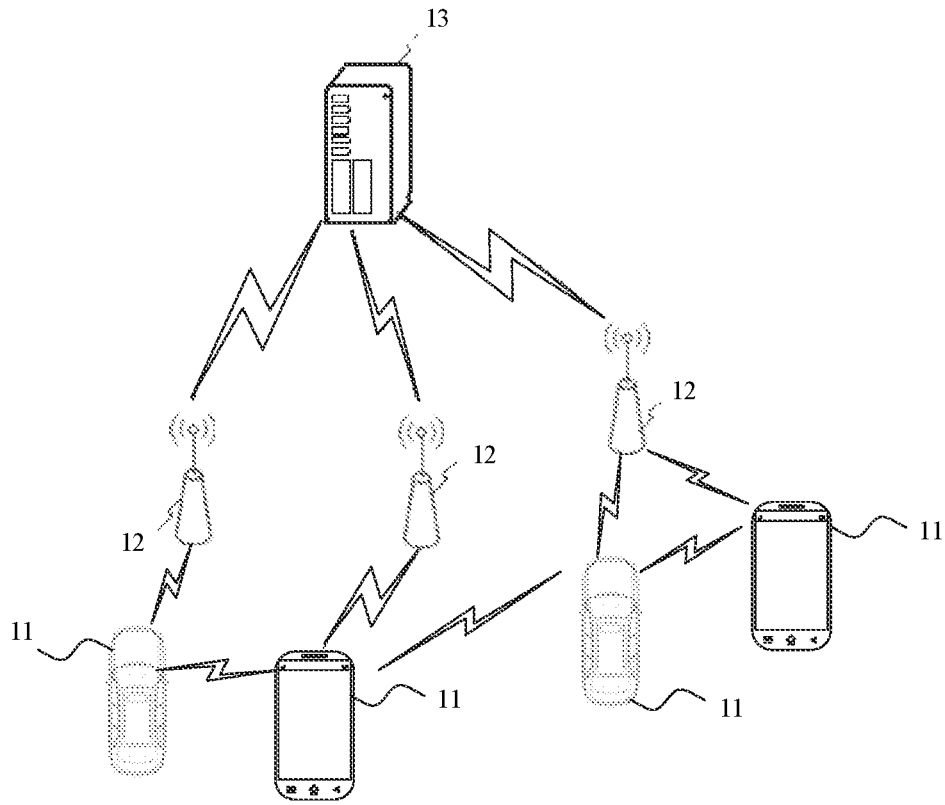
FIG. 1 is a schematic diagram illustrating a structure of a wireless communication system according to an illustrative embodiment.

Referring to FIG. 1, FIG. 1 is a schematic diagram illustrating a structure of a wireless communication system according to an illustrative embodiment. As illustrated in FIG. 1, a wireless communication system is a communication system based on cellular mobile communication technologies. The wireless communication system may include several terminals 11 and several base stations 12.

The terminal 11 may be a device that provides voice and/or data connectivity to a user. The terminal 11 may communicate with one or more core networks through radio access network (RAN). The terminal 11 may be an Internet of Things terminal, such as a sensor device, a mobile phone (or "cellular" phone) and a computer with the Internet of Things terminal, such as fixed, portable, pocket, handheld, computer built-in or on-board devices. For example, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be an on-board device, for example, a trip computer with a wireless communication function, or a wireless communication device connected to an external trip computer. Alternatively, the terminal 11 may also be a roadside device, for example, a street lamp, a signal light or other roadside devices with the wireless communication function.

The base station 12 may be a network side device in the wireless communication system. The wireless communication system may be the 4th generation mobile communication (4G) system, also called as a Long Term Evolution (LTE) system. Alternatively, the wireless communication system may also be a 5G system, also called as a new radio (NR) system or a 5G NR system. Alternatively, the wireless communication system may also be the next generation system of the 5G system. An access network in the 5G system may be called as NG-RAN (New Generation-Radio Access Network), or a MTC system.

The base station 12 may be an evolutionary base station (eNB) used in the 4G system. Alternatively, the base station 12 may also be a base station (gNB) used a centralized distributed architecture in the 5G system. When using the centralized and distributed architecture, the base station 12 generally includes a central unit (CU) and at least two distributed units (DU). The centralized unit is provided with protocol stacks of a packet data convergence protocol (PDCP) layer, a radio link control (RLC) protocol layer and a media access control (MAC) layer. The distribution unit is provided with a protocol stack of a physical (PHY) layer. Embodiments of the present disclosure do not define the specific implementation mode of the base station 12.

A wireless connection may be established between the base station 12 and the terminal 11 through a wireless air-interface. In different embodiments, the wireless air-interface is a wireless air-interface based on the 4th generation mobile communication network technology (4G) standard. Alternatively, the wireless air-interface is a wireless air-interface based on the 5th generation mobile communication network technology (5G) standard, for example, the wireless air-interface is a new radio. Alternatively, the wireless air-interface may also be a wireless air-interface based on the next generation mobile communication network technology standard relative to 5G.

In some embodiments, the wireless communication system described above may also include a network management device 13.

Several base stations 12 are respectively connected to the network management device 13. The network management device 13 may be the core network device in the wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS), and the like. Embodiments of the present disclosure do not define the implementation form of the network management device 13.

The execution subjects involved in embodiments of the present disclosure include, but are not limited to, an industrial sensor, a video surveillance, a wearable device and other UEs that use 5G cellular mobile communication technology to communicate, as well as a base station.

An application scenario of an embodiment of the present disclosure is that complexity of REDCAPUE is reduced, for example, the antenna is reduced to one, a wireless signal reception capacity of the UE is reduced, and a communication quality is likely to be reduced.

Figure 2:
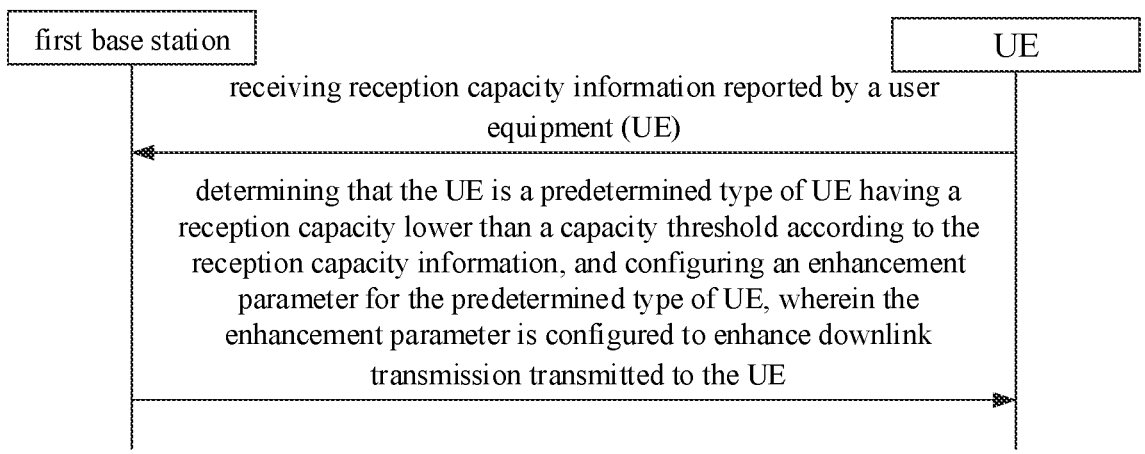
FIG. 2 is a flowchart illustrating a method for transmitting information according to an illustrative embodiment.

As illustrated in FIG. 2, an illustrative embodiment provides a method for transmitting information. The method may be applicable for a first base station of wireless communication, and include the following blocks.

At block 201, reception capacity information reported by a user equipment (UE) is received.

At block 202, it is determined that the UE is a predetermined type of UE having a reception capacity lower than a capacity threshold according to the reception capacity information, and an enhancement parameter is configured for the predetermined type of UE. The enhancement parameter is configured to enhance downlink transmission transmitted to the UE.

The UE may include, but not limited to, a reduced capability UE in 3GPP R17 version protocol. Compared with an enhanced mobile broadband (eMBB) UE, the reduced capability UE generally has a simple structure, such as a small number of antennas. Moreover, the reduced capability UE generally have a relatively weak signal reception capability from the perspective of coverage since the reduced capability UE is required to coexist with the eMBB UE and other USs in the same cell.

The reduced capability UE may report its signal reception capability to the base station when accessing the base station. The reception capability information may include at least one of a reception antenna number and a reception antenna gain, etc. of the UE. The UE may report the signal reception capability to the base station through RRC signaling and the like when accessing.

The UE may report the signal reception capability through the RRC signaling when establishing a RRC connection. A reserved bit in the existing RRC signaling may be used to bring the signal reception capability. In this way, multiplexing the RRC signaling may improve a usage efficiency of the RRC signaling. The RRC signaling may include, but not be limited to, at least one of RRC connection signaling, RRC configuration signaling, and RRC reconfiguration signaling.

The base station may determine a type of UE according to the reception capacity information reported by the UE, such as at least one of antenna number information, reception antenna gain information, and reduced capacity information.

Herein, the predetermined type of UE may include a reduced capacity UE or a UE with poor signal reception capacity. The UE may report the reduced capability information, and the base station may determine the UE that reports the reduced capability information as the reduced capability UE.

The base station may preset the capability threshold. The capability threshold may be at least one of a reception antenna number threshold, and a reception antenna gain threshold, or the like.

The base station may determine the type of UE by comparing the reception capacity information and the capacity threshold. For example, the UE may be distinguished as a RECAP UE or an eMBB UE.

The base station may configure the enhancement parameter for the predetermined type of UE, such as the reduced capacity UE. The base station may perform the downlink communication with the predetermined type of UE according to the enhancement parameter when communicating with the predetermined type of UE.

The enhancement parameter may be configurations for enhancing the downlink transmission, and the downlink transmission configured based on the enhancement parameter may have stronger transmission performance or better fault tolerance. Illustratively, the enhancement parameter may be a transmission power enhancement parameter. The base station may enhance the downlink transmission through the transmission power enhancement parameter. Compared with a non-predetermined type of UE such as the eMBB UE, the base station may improve a power of the downlink transmission to the predetermined type of UE through the transmission power enhancement parameter, to improve signal strength of a downlink signal received by the predetermined type of UE. Thus, communication requirements of the predetermined type of UE may be satisfied.

The base station may also compensate for link loss of the downlink transmission while enhancing the downlink transmission through the enhancement parameter. The base station may measure the link loss of the downlink transmission through an uplink signal. As an example, the base station may add the enhancement parameter on the basis of the compensation for the link loss, to enhance the downlink transmission at the same time.

In this way, the base station performs the downlink transmission based on the determined enhancement parameter, such that the downlink transmission may satisfy requirements of the UE for reception strength, thus improving a success rate of receiving wireless signals for the UE, reducing retransmission due to reception failure, and improving a utilization efficiency of transmission resources.

In an embodiment, configuring the enhancement parameter for the predetermined type of UE may include:
configuring the enhancement parameter for the predetermined type of UE based on mobility information of the UE.

The mobility information may represent mobility attribute of the UE, for example, at least one of a mobile speed, a mobile range and a mobile frequency of the UE. Under a circumstance of high-frequency communication, different mobility has different requirements for signal quality. Herein, different enhancement parameters are set for different mobile conditions of the UE. Each enhancement parameter may satisfy downlink transmission requirements of the corresponding mobility.

Therefore, the enhancement parameter may be configured for the predetermined type of UE based on the mobility information. Different enhancement parameters are set for different mobility, such that quality of signals sent by the base station may satisfy requirements on mobility of the UE. Poor communication quality of UE or even call drop resulting from the signal quality failing to satisfy the requirements may be reduced.

In an embodiment, the method for transmitting information may also include at least one of:
receiving the mobility information reported by the UE;
determining the mobility information based on preset uplink information of the UE.

Herein, the mobility information may be reported by the UE. The UE may determine its own mobility information through positioning and other manners, and send the determined mobility information to the first base station.

The preset uplink information may be a wireless signal measurement report of the UE, etc. The base station may determine the mobility of the UE based on a preset algorithm and other algorithms through signal quality parameters such as strengths of reception signals in the wireless signal measurement report of the UE at different time points. For example, a change of a speed of the UE may be determined by a change rate of wireless signal reception strength reported by the UE.

In an embodiment, configuring the enhancement parameter or the predetermined type of UE based on the mobility information of the UE may include:
in response to the mobility information indicating that the predetermined type of UE has a first mobility, configuring a first enhancement parameter for the predetermined type of UE;
or, in response to the mobility information indicating that the predetermined type of UE has a second mobility, configuring a second enhancement parameter for the predetermined type of UE.

The first mobility is greater than the second mobility, and a transmission gain of the downlink transmission configured based on the first enhancement parameter is greater than a transmission gain of the downlink transmission configured based on the second enhancement parameter.

The transmission gain herein may include at least one of a time domain gain, a space domain gain and a frequency domain gain.

Herein, the stronger downlink transmission may be configured in response to the predetermined type of UE having large mobility, such as the predetermined type of UE having a fast mobile speed. The stronger downlink transmission may be performed through a wireless signal with higher power.

The weaker downlink transmission may be configured in response to the predetermined type of UE having low mobility, such as the predetermined type of UE having a slow mobile speed. The weaker downlink transmission may be performed through a wireless signal with lower power.

In this way, the downlink transmission may satisfy different requirements for signal strength of the predetermined type of user equipment in motion, thus improving the success rate of receiving the wireless signal for the predetermined type of user equipment, reducing retransmission due to the reception failure, and further improving the utilization efficiency of the transmission resources.

In an embodiment, the method may further include:
determining a compensation condition for enhancing the downlink transmission transmitted to the predetermined type of UE using the enhancement parameter.

The compensation condition includes at least one of the following conditions: a region compensation condition, a channel compensation condition, and a mobility compensation condition. The region compensation condition may include a compensation region in which the enhancement parameter is applied. The channel compensation condition may include at least one of a channel type to which the enhancement parameter is applied and a channel quality to which the enhancement parameter is applied. The mobility compensation condition may include a mobility type to which the enhancement parameter is applied.

Herein, the region compensation condition may be enhancing the downlink transmission sent to the predetermined type of UE with the enhancement parameter when the predetermined type of UE is in the predetermined region. For example, the base station may first determine a region with weak wireless signal coverage, and enhance the downlink transmission sent to the predetermined type of UE with the enhancement parameter when the predetermined type of UE is in the region with weak wireless signal coverage. In this way, communication quality of the region with weak wireless signal coverage may be improved.

The channel types may be different channels classified based on channel spectrum, which may include a high frequency channel and a low frequency channel. The frequency of the frequency band used by the high frequency channel is higher than that used by the low frequency channel. For another example, the channel types may also be classified into a granted channel and an ungranted channel according to whether the channel is required to be granted for usage.

Different types of channels have different frequency bands, and carriers used on different channels have different wavelengths. Signals with different wavelengths have different transmission coverage distances. For a channel with a short transmission coverage distance, the enhancement parameter may be used. For a channel with a large transmission coverage distance, the enhancement parameter may not be applied, or the enhancement parameter with weak enhancement effect may be set. For example, when the predetermined type of UE accesses the base station through a channel with the short transmission coverage distance, the downlink transmission sent to the predetermined type UE may be enhanced with the enhancement parameter. In this way, the communication quality may be improved.

The base station may further determine the communication quality of the downlink transmission channel based on the measurement report of the predetermined type of UE. When the communication quality is lower than a quality threshold, the downlink transmission sent to the predetermined type of UE is enhanced with the enhancement parameter. In this way, the communication quality may be improved.

The mobility types may include: a static state, different mobile speed levels, etc. The base station may determine the mobile speed of the predetermined type of UE. For different mobility situations, the predetermined type of UE has different strength requirements for the downlink transmission. The enhancement parameter may be applied when the mobility compensation condition is satisfied. For example, when the mobile speed of the predetermined type of UE exceeds a speed threshold, the enhancement parameter is applied to ensure reliability of the downlink transmission under the mobile condition. The predetermined type of UE such as RECAP UE may be a monitoring device, etc. The predetermined type of UE is not designed for high mobility. Therefore, when the mobility of the UE is improved, it is required to enhance the downlink transmission for high mobility. For example, the success rate of receiving the downlink transmission for the UE is improved by increasing the signal transmission power.

In an embodiment, the method may further include:

receiving auxiliary information reported by the UE.

The determining the compensation condition for enhancing the downlink transmission transmitted to the predetermined type of UE using the enhancement parameter may include:

determining the compensation condition according to the auxiliary information.

The auxiliary information may include an indication of the compensation condition. The indication of the compensation condition may be at least one of an indication for adding the compensation condition, and an indication for updating the compensation condition. The UE may send the auxiliary information to the base station according to its own reception situation, and indicate the compensation condition for applying the enhancement parameter to the base station. The compensation condition indicated by the auxiliary information may include at least one of: an indication of a scenario under which the enhancement parameter are applied during cell handover, and an indication of a scene under which the enhancement parameter are applied at a time beyond the cell handover. The cell handover is generally at a location far from the base station or at a location with weak signal coverage. Applying enhancement parameter during the cell handover may ensure good downlink transmission during the cell handover and improve a success rate of the handover.

Illustratively, the enhancement parameter may be used for a scenario of cell handover. For the time beyond the cell handover, the enhancement parameter may not be set, or the enhancement parameter with weak enhancement effect may be set.

In this way, the UE may actively set the compensation condition for applying the enhancement parameter according to its own reception condition, which improve initiative of the UE in selection of applying the enhancement parameter, thus improving the success rate of receiving the downlink transmission, reducing retransmissions due to the reception failures, and further improving the utilization efficiency of the transmission resources.

In an embodiment, determining that the UE is the predetermined type of UE having the reception capacity lower than the capacity threshold according to the reception capacity information, and configuring the enhancement parameter for the predetermined type of UE includes:

determining that the UE is the predetermined type of UE according to the reception capacity information, and configuring for the predetermined type of UE, the enhancement parameter for the downlink transmission of the predetermined type of UE in the compensation region.

The compensation region may be a region with poor signal coverage of the base station, or a region with a large number of UEs. The quality of the wireless signal in the compensation region may be relatively poor. The predetermined type of UE has a low success rate of receiving the downlink transmission in the compensation region. The enhancement parameter may be applied to the compensation region, and the downlink transmission may be compensated by enhancing the transmission power or by multiple times of repetition transmissions, to improve the success rate of receiving the downlink transmission for the predetermined type of UE.

In an embodiment, the compensation region may include a cell edge region.

In one embodiment, the cell edge region is relative to a cell center region. The cell center region is closer to the location of the base station than the cell edge region, that is, the cell edge region is located surrounding the cell center region, and a distance between the cell center region and the base station is smaller than a distance between the cell edge region and the base station.

In an embodiment, the cell edge region may be a region from a boundary line with a preset distance from the base station to a cell boundary.

The compensation region may be a region where the wireless signal coverage of the base station is weak, for example, the cell edge region or regions with strong occlusion coverage. The regions with strong shielding coverage may include, but not be limited to, at least one of a tunnel, a building and an underground rail transit.

In the compensation region, the eMBB UE may normally receive the downlink signal sent by the base station because of its high reception antenna gain. The reduced capacity UE with a single antenna and the like has higher requirements on the received wireless signal because of its low reception antenna gain. For example, the reduced capacity UE has higher requirements on signal strength of the wireless signal. In the compensation region, the reduced capacity UE may have situations of poor reception quality or even failing to receive the downlink signal sent by the base station.

The enhancement parameter may be applied to the cell edge region, and the downlink transmission may be compensated by enhancing the transmission power or by multiple times of repetition transmissions, to improve the success rate of receiving the downlink transmission for the predetermined type of UE in the cell edge region.

In an embodiment, the method may further include:

transmitting an enhancement parameter configured in a current serving cell to a second base station of a target cell in response to handover of the predetermined type of UE from the current serving cell to the target cell.

When the handover of the predetermined type of UE from the current serving cell to the target cell is performed, the base station of the current serving cell may transmit the enhancement parameter to the base station of the target cell.

The base station of the target cell may apply the enhancement parameter after the predetermined type of UE completes the handover to enhance the downlink transmission to the predetermined type of UE.

Figure 3A:
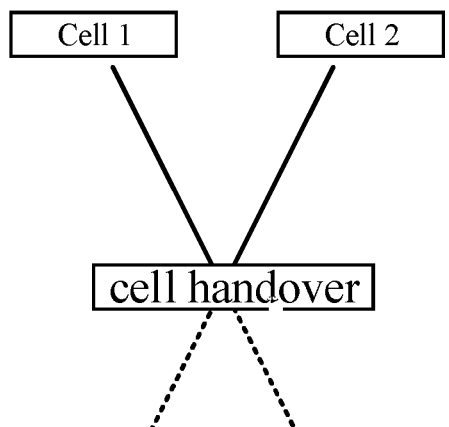
FIG. 3 is a schematic diagram illustrating cell handover according to an illustrative embodiment.
Figure 3B:
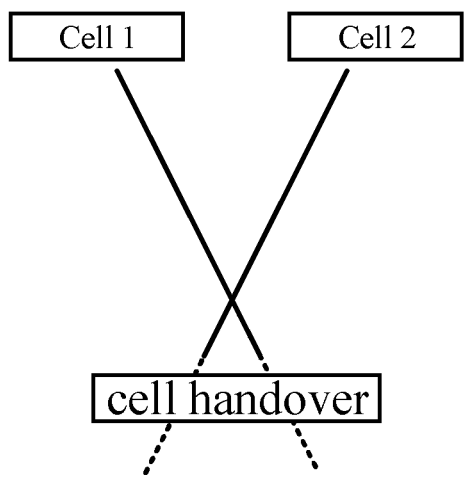

As illustrated in FIG. 3a, in response to the signal strength of both the current serving cell and the target cell being strong at a position where the handover of the predetermined type of UE from the current serving cell to the target cell is performed, the downlink transmission before and after the handover for the predetermined type of UE may be reduced normally. As illustrated in FIG. 3b, in response to the signal strength of both the current serving cell and the target cell being weak at a position where the handover of the predetermined type of UE from the current serving cell to the target cell is performed, the current serving cell may enhance the downlink transmission with the predetermined type of UE through the enhancement parameter, to improve the success rate of receiving the downlink transmission for the predetermined type of UE. In a case that the base station of the current serving cell does not transmit the enhancement parameter to the base station of the target cell, the base station of the target cell will not use the enhancement parameter for the predetermined type of UE, thus affecting the success rate of receiving the downlink transmission of the target cell for the predetermined type of UE. In a cast that the base station of the current serving cell transmits the enhancement parameter to the base station of the target cell, the base station of the target cell may apply the enhancement parameter for the predetermined type of UE, to improve the success rate of receiving the downlink transmission of the target cell for the predetermined type of UE. For example, it may ensure the success rate of the downlink transmission during the cell handover, thus ensuring the success rate of the handover and reducing a delay of the cell handover. The downlink transmission herein at least includes downlink signaling.

In an embodiment of the present disclosure, the base station of the current serving cell transmits the enhancement parameter to the base station of the target cell. The base station of the target cell may enhance the downlink transmission to the predetermined type of UE with the enhancement parameter, and improve the success rate of receiving the downlink transmission for the predetermined type of UE in the target cell.

In an embodiment, transmitting the enhancement parameter configured in the current serving cell to the second base station of the target cell in response to the handover of the predetermined type of UE from the current serving cell to the target cell includes:

transmitting the enhancement parameter configured in the current serving cell to the second base station of the target cell in response to the handover of the predetermined type of UE from the current serving cell to the target cell through non-random access RACH-Less.

The handover through the non-random access may include: handover from a source cell to the target cell with a handover method other than random access. For example, the handover through non-random access may include: the target base station pre-allocates for the UE with periodic uplink resource scheduling (UL grant), and the user equipment may send a handover message other than a random access message by the pre-allocated UL grant and further handover from a source base station to a target base station. The source base station stops the downlink transmission in response to determining that the handover of the UE to the target base station has performed. In a process of the handover, the user equipment does not perform random access and does not report its own information to the base station.

The UE does not report the reception capacity information when accessing the target cell through the non-random RACH Less-access. Therefore, the base station of the target cell cannot determine the type of the UE. It is impossible, for the predetermined type of UE, to enhance the downlink transmission sent to the predetermined type of UE with the enhancement parameter.

Therefore, the enhancement parameter is transmitted to the base station of the target cell, such that the base station of the target cell may apply the enhancement parameter to enhance the downlink transmission with the predetermined type of UE. The success rate of receiving the downlink transmission for the predetermined type of UE in the target cell may be improved.

In an embodiment, the method may further include:

transmitting at least one of the enhancement parameter and a request for enhancing the downlink transmission with the enhancement parameter to the predetermined type of UE;

receiving indication information transmitted by the predetermined type of UE in response to at least one of the enhancement parameter and the request, wherein the indication information indicates whether to enhance the downlink transmission with the enhancement parameter.

The UE may configure its own air-interface radio resource configuration, and the first base station may send at least one of the enhancement parameter and the request for enhancing the downlink transmission with the enhancement parameter to the UE. The UE may determine whether to enhance downlink transmission with the enhancement parameter to its own signal reception situation, and send an indication on whether to enhance the downlink transmission with the enhancement parameter.

After receiving the instruction information, the first base station may enhance the downlink transmission with the enhancement parameter according to the instruction information, or do not enhance the downlink transmission.

In an embodiment, the enhancement parameter may include at least one of a power boosting parameter and a repetition transmission parameter.

The power boosting parameter may be a resource configuration of power boosting. The base station may improve a power of a signal by applying the resource configuration of power boosting, thus improving the strength of the signal received by the predetermined type of UE. Requirements of the predetermined type of UE for the signal strength are satisfied. The success rate of receiving the downlink transmission for the predetermined type of UE is improved.

The repetition transmission parameter may be a resource configuration of repetition. The base station may repeat the downlink transmission to achieve power accumulation. The UE may combine and decode repeatedly received data to improve the success rate of data decoding. The success rate of receiving the downlink transmission for the predetermined type of UE is improved.

In an embodiment, the power boosting parameter may include a power boosting level. The repetition transmission parameter may include a repetition transmission level.

Here, the power boosting parameter may be the power boosting level. Different power boosting resource configurations are configured for different power boosting levels. Using the power boosting level may simplify setting of the enhancement parameter and improve a setting efficiency. The power boosting level may be expressed in a form of x dB.

The repetition transmission parameter may be the repetition transmission level. Different repetition transmission resource configurations are configured for different repetition transmission levels. Using the repetition transmission parameters may simplify the setting of the enhancement parameter and improve the setting efficiency.

In an embodiment, the reception capacity information may include antenna number information of the UE.

Here, the reception capacity information may be the antenna number information of the UE. The base station determines whether the UE is the predetermined type of UE according to the antenna number information of the UE, and then determines whether to apply the enhancement parameter.

Figure 4:
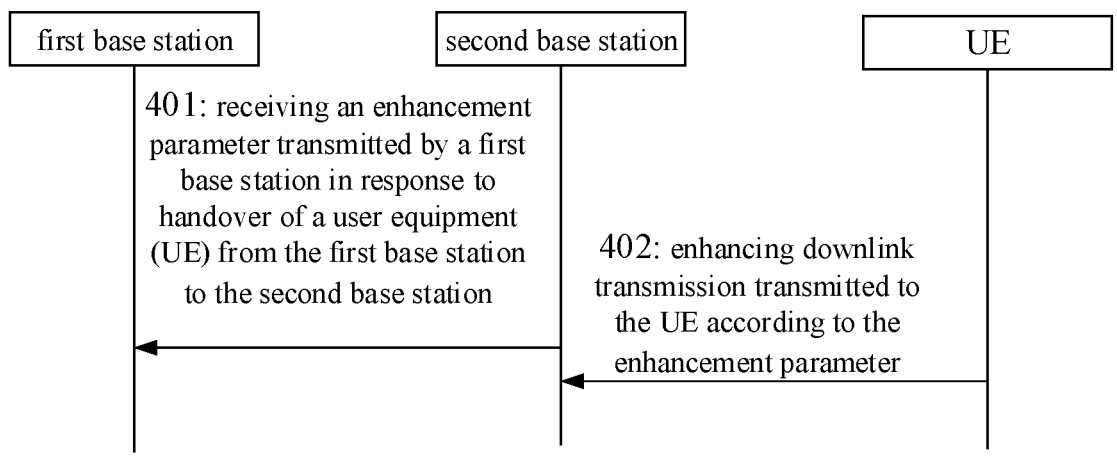
FIG. 4 is a flowchart illustrating another method for transmitting information applicable to a base station according to an illustrative embodiment.

As illustrated in FIG. 4, FIG. 4 is a flowchart illustrating another method for transmitting information according to an illustrative embodiment. The method may be applicable for a second base station of wireless communication, and include the following blocks.

At block 401, an enhancement parameter transmitted by a first base station in response to handover of a user equipment (UE) from the first base station to the second base station is received.

At block 402, downlink transmission transmitted to the UE is enhanced according to the enhancement parameter.

The UE may include, but not limited to, a reduced capability UE in 3GPP R17 version protocol. Compared with an eMBB UE, the reduced capability UE generally has a simple structure, such as a small number of antennas. Moreover, the reduced capability UE generally have a relatively weak signal reception capability from the perspective of coverage since the reduced capability UE is required to coexist with the eMBB UE and other USs in the same cell.

The reduced capability UE may report its signal reception capability to the base station when accessing the base station. The reception capability information may include at least one of a reception antenna number and a reception antenna gain, etc. of the UE. The UE may report the signal reception capability to the base station through RRC signaling and the like when accessing.

The UE may report the signal reception capability through the RRC signaling when establishing a RRC connection. A reserved bit in the existing RRC signaling may be used to bring the signal reception capability. In this way, multiplexing the RRC signaling may improve a usage efficiency of the RRC signaling. The RRC signaling may include, but not be limited to, at least one of RRC connection signaling, RRC configuration signaling, and RRC reconfiguration signaling.

The base station may determine a type of UE according to the reception capacity information reported by the UE, such as at least one of antenna number information, reception antenna gain information, and reduced capacity information. Herein, the predetermined type of UE may include a reduced capacity UE or a UE with poor signal reception capacity. The UE may report the reduced capability information, and the base station may determine the UE that reports the reduced capability information as the reduced capability UE.

The base station may preset the capability threshold. The capability threshold may be at least one of a reception antenna number threshold, and a reception antenna gain threshold, or the like.

The base station may determine the type of UE by comparing the reception capacity information and the capacity threshold. For example, the UE may be distinguished as a RECAP UE or an eMBB UE.

The base station may configure the enhancement parameter for the predetermined type of UE, such as the reduced capacity UE. The base station may perform the downlink communication with the predetermined type of UE according to the enhancement parameter when communicating with the predetermined type of UE.

Illustratively, the enhancement parameter may be a transmission power enhancement parameter. The base station may enhance the downlink transmission through the transmission power enhancement parameter. Compared with a non-predetermined type of UE such as the eMBB UE, the base station may improve a power of the downlink transmission to the predetermined type of UE through the transmission power enhancement parameter, to improve signal strength of a downlink signal received by the predetermined type of UE. Thus, communication requirements of the predetermined type of UE may be satisfied.

The base station may also compensate for link loss of the downlink transmission while enhancing the downlink transmission through the enhancement parameter. The base station may measure the link loss of the downlink transmission through an uplink signal. As an example, the base station may add the enhancement parameter on the basis of the compensation for the link loss, to enhance the downlink transmission at the same time.

In this way, the base station performs the downlink transmission based on the determined enhancement parameter, such that the downlink transmission may satisfy requirements of the UE for reception strength, thus improving a success rate of receiving wireless signals for the UE, reducing retransmission due to reception failure, and improving a utilization efficiency of transmission resources.

When handover of the predetermined type of UE from a current serving cell to a target cell is performed, the base station of the current serving cell may transmit the enhancement parameter to the base station of the target cell.

The base station of the target cell may apply the enhancement parameter after the predetermined type of UE completes the handover to enhance the downlink transmission to the predetermined type of UE.

As illustrated in FIG. 3a, in response to the signal strength of both the current serving cell and the target cell being strong at a position where the handover of the predetermined type of UE from the current serving cell to the target cell is performed, the downlink transmission before and after the handover for the predetermined type of UE may be reduced normally. As illustrated in FIG. 3b, in response to the signal strength of both the current serving cell and the target cell being weak at a position where the handover of the predetermined type of UE from the current serving cell to the target cell is performed, the current serving cell may enhance the downlink transmission with the predetermined type of UE through the enhancement parameter, to improve the success rate of receiving the downlink transmission for the predetermined type of UE. In a case that the base station of the current serving cell does not transmit the enhancement parameter to the base station of the target cell, the base station of the target cell will not use the enhancement parameter for the predetermined type of UE, thus affecting the success rate of receiving the downlink transmission of the target cell for the predetermined type of UE. In a cast that the base station of the current serving cell transmits the enhancement parameter to the base station of the target cell, the base station of the target cell may apply the enhancement parameter for the predetermined type of UE, to improve the success rate of receiving the downlink transmission of the target cell for the predetermined type of UE. For example, it may ensure the success rate of the downlink transmission during the cell handover, thus ensuring the success rate of the handover and reducing a delay of the cell handover. The downlink transmission herein at least includes downlink signaling.

In an embodiment of the present disclosure, the base station of the current serving cell transmits the enhancement parameter to the base station of the target cell. The base station of the target cell may enhance the downlink transmission to the predetermined type of UE with the enhancement parameter, and improve the success rate of receiving the downlink transmission for the predetermined type of UE in the target cell.

In an embodiment, receiving the enhancement parameter which is transmitted by the first base station in response to the handover of the user equipment (UE) from the first base station to the second base station may include:

receiving the enhancement parameter which is transmitted by the first base station in response to the handover of the UE from the first base station to the second base station through non-random access (RACH-Less).

The handover through the non-random access may include: handover from a source cell to the target cell with a handover method other than random access. For example, the handover through non-random access may include: the target base station pre-allocates for the UE with periodic uplink resource scheduling (UL grant), and the user equipment may send a handover message other than a random access message by the pre-allocated UL grant and further handover from a source base station to a target base station. The source base station stops the downlink transmission in response to determining that the handover of the UE to the target base station has performed. In a process of the handover, the user equipment does not perform random access and does not report its own information to the base station.

The UE does not report the reception capacity information when accessing the target cell through the non-random RACH Less-access. Therefore, the base station of the target cell cannot determine the type of the UE. It is impossible, for the predetermined type of UE, to enhance the downlink transmission sent to the predetermined type of UE with the enhancement parameter.

Therefore, the enhancement parameter is transmitted to the base station of the target cell, such that the base station of the target cell may apply the enhancement parameter to enhance the downlink transmission with the predetermined type of UE. The success rate of receiving the downlink transmission for the predetermined type of UE in the target cell may be improved.

In an embodiment, enhancing the downlink transmission transmitted to the UE according to the enhancement parameter may include:

determining a target enhancement parameter based on the enhancement parameter, according to a difference in signal coverage between the first base station and the second base station; and enhancing the downlink transmission transmitted to the UE according to the target enhancement parameter.

Here, difference in signal coverage may be difference in signal power or difference in an area of a signal coverage region. The target enhancement parameter may be adjusted based on the difference in the signal coverage region between the first base station and the second base station. For example, when a signal power of the first base station is greater than a signal power of the second base station, the target enhancement parameter may further enhance the downlink transmission based on the enhancement parameter. When the area of the signal coverage of the first base station is larger than the area of the signal coverage of the second base station, the target enhancement parameter may further enhance the downlink transmission based on the enhancement parameter. In this way, when the predetermined type of UE accesses the second base station, the enhanced downlink transmission may satisfy requirements of the predetermined type of UE for the signal strength and the like. The success rate of receiving the downlink transmission for the predetermined type of UE is improved.

In an embodiment, the enhancement parameter may include at least one of a power boosting parameter and a repetition transmission parameter.

The power boosting parameter may be a resource configuration of power boosting. The base station may improve a power of a signal by applying the resource configuration of power boosting, thus improving the strength of the signal received by the predetermined type of UE. Requirements of the predetermined type of UE for the signal strength are satisfied. The success rate of receiving the downlink transmission for the predetermined type of UE is improved.

The repetition transmission parameter may be a resource configuration of repetition. The base station may repeat the downlink transmission to achieve power accumulation. The UE may combine and decode repeatedly received data to improve the success rate of data decoding. The success rate of receiving the downlink transmission for the predetermined type of UE is improved.

In an embodiment, the power boosting parameter may include a power boosting level. The repetition transmission parameter may include a repetition transmission level.

Here, the power boosting parameter may be the power boosting level. Different power boosting resource configurations are configured for different power boosting levels. Using the power boosting level may simplify setting of the enhancement parameter and improve a setting efficiency. The power boosting level may be expressed in a form of x dB.

The repetition transmission parameter may be the repetition transmission level. Different repetition transmission resource configurations are configured for different repetition transmission levels. Using the repetition transmission parameters may simplify the setting of the enhancement parameter and improve the setting efficiency.

In an embodiment, the reception capacity information may include antenna number information of the UE.

Here, the reception capacity information may be the antenna number information of the UE. The base station determines whether the UE is the predetermined type of UE according to the antenna number information of the UE, and then determines whether to apply the enhancement parameter.

Figure 5:
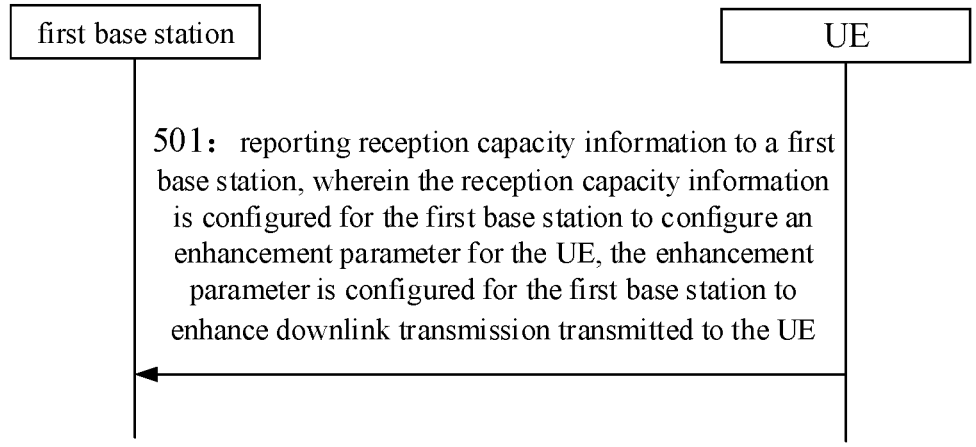
FIG. 5 is a flowchart illustrating yet another method for transmitting information applicable for a user equipment (UE) according to an illustrative embodiment.

As illustrated in FIG. 5, FIG. 5 is a flowchart illustrating another method for transmitting information according to an illustrative embodiment. The method may be applicable for a UE of wireless communication, and include the following blocks.

At block 501, reception capacity information is reported to a first base station. The reception capacity information is configured for the first base station to configure an enhancement parameter for the UE, and the enhancement parameter is configured for the first base station to enhance downlink transmission transmitted to the UE.

The UE may include, but not limited to, a reduced capability UE in 3GPP R17 version protocol. Compared with an eMBB UE, the reduced capability UE generally has a simple structure, such as a small number of antennas. Moreover, the reduced capability UE generally have a relatively weak signal reception capability from the perspective of coverage since the reduced capability UE is required to coexist with the eMBB UE and other USs in the same cell.

The reduced capability UE may report its signal reception capability to the base station when accessing the base station. The reception capability information may include at least one of a reception antenna number and a reception antenna gain, etc. of the UE. The UE may report the signal reception capability to the base station through RRC signaling and the like when accessing.

The UE may report the signal reception capability through the RRC signaling when establishing a RRC connection. A reserved bit in the existing RRC signaling may be used to bring the signal reception capability. In this way, multiplexing the RRC signaling may improve a usage efficiency of the RRC signaling. The RRC signaling may include, but not be limited to, at least one of RRC connection signaling, RRC configuration signaling, and RRC reconfiguration signaling.

The base station may determine a type of UE according to the reception capacity information reported by the UE, such as at least one of antenna number information, reception antenna gain information, and reduced capacity information. Herein, the predetermined type of UE may include a reduced capacity UE or a UE with poor signal reception capacity. The UE may report the reduced capability information, and the base station may determine the UE that reports the reduced capability information as the reduced capability UE.

The base station may preset the capability threshold. The capability threshold may be at least one of a reception antenna number threshold, and a reception antenna gain threshold, or the like.

The base station may determine the type of UE by comparing the reception capacity information and the capacity threshold. For example, the UE may be distinguished as a RECAP UE or an eMBB UE.

The base station may configure the enhancement parameter for the predetermined type of UE, such as the reduced capacity UE. The base station may perform the downlink communication with the predetermined type of UE according to the enhancement parameter when communicating with the predetermined type of UE.

Illustratively, the enhancement parameter may be a transmission power enhancement parameter. The base station may enhance the downlink transmission through the transmission power enhancement parameter. Compared with a non-predetermined type of UE such as the eMBB UE, the base station may improve a power of the downlink transmission to the predetermined type of UE through the transmission power enhancement parameter, to improve signal strength of a downlink signal received by the predetermined type of UE. Thus, communication requirements of the predetermined type of UE may be satisfied.

The base station may also compensate for link loss of the downlink transmission while enhancing the downlink transmission through the enhancement parameter. The base station may measure the link loss of the downlink transmission through an uplink signal. As an example, the base station may add the enhancement parameter on the basis of the compensation for the link loss, to enhance the downlink transmission at the same time.

In this way, the base station performs the downlink transmission based on the determined enhancement parameter, such that the downlink transmission may satisfy requirements of the UE for reception strength, thus improving a success rate of receiving wireless signals for the UE, reducing retransmission due to reception failure, and improving a utilization efficiency of transmission resources.

The mobility information may represent mobility attribute of the UE, for example, at least one of mobile speed information, a mobile range and a mobile frequency of the UE. Under a circumstance of high-frequency communication, different mobility has different requirements for signal quality. Herein, different enhancement parameters are set for different mobile conditions of the UE. Each enhancement parameter may satisfy downlink transmission requirements of the corresponding mobility.

Therefore, the enhancement parameter may be configured for the predetermined type of UE based on the mobility information. Different enhancement parameters are set for different mobility, such that quality of signals sent by the base station may satisfy requirements on mobility of the UE. Poor communication quality of UE or even call drop resulting from the signal quality failing to satisfy the requirements may be reduced.

Figure 6:
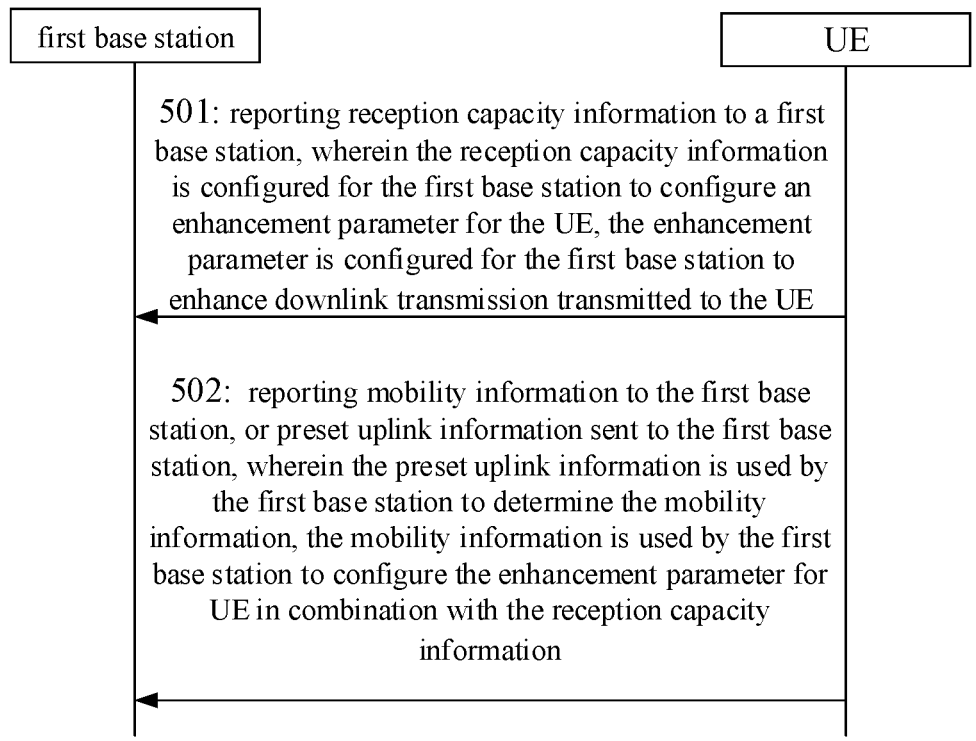
FIG. 6 is a flowchart illustrating still another method for transmitting information according to an illustrative embodiment.

In an embodiment, as illustrated in FIG. 6, the method may further include the following block.

At block 502, auxiliary information is reported to the first base station. The auxiliary information is configured for the first base station to determine a compensation condition for enhancing the downlink transmission transmitted to the UE using the enhancement parameter.

The mobility information may be mobile speed information of the UE. Under a circumstance of high-frequency communication, different mobility has different requirements for signal quality.

Therefore, the enhancement parameter may be configured for the predetermined type of UE based on the mobility. Different enhancement parameters are set for different mobility, such that quality of signals sent by the base station may satisfy requirements on mobility of the UE. Poor communication quality of UE or even call drop resulting from the signal quality failing to satisfy the requirements may be reduced.

Herein, the mobility information may be reported by the UE. The UE may determine its own mobility information through positioning and other manners, and send the determined mobility information to the first base station.

The preset uplink information may be a wireless signal measurement report of the UE, etc. The base station may determine the mobility of the UE based on a preset algorithm and other algorithms through signal quality parameters such as strengths of reception signals in the wireless signal measurement report of the UE at different time points. For example, a change of a speed of the UE may be determined by a change rate of wireless signal reception strength reported by the UE.

In an embodiment, the method may further include:
reporting auxiliary information to the first base station, in which the auxiliary information is configured for the first base station to determine a compensation condition for enhancing the downlink transmission transmitted to the UE using the enhancement parameter.

The auxiliary information may include an indication of the compensation condition. The indication of the compensation condition may be at least one of an indication for adding the compensation condition, and an indication for updating the compensation condition. The UE may send the auxiliary information to the base station according to its own reception situation, and indicate the compensation condition for applying the enhancement parameter to the base station. The compensation condition indicated by the auxiliary information may include at least one of: an indication of applying the enhancement parameter during cell handover, an indication of applying the enhancement parameter during cell non-handover, and an indication of a scene under which the enhancement parameter are applied at a time beyond the cell handover. The cell handover is generally at a location far from the base station or at a location with weak signal coverage. Applying enhancement parameter during the cell handover may ensure good downlink transmission during the cell handover and improve a success rate of the handover.

Illustratively, the enhancement parameter may be used for a scenario of cell handover. For the time beyond the cell handover, the enhancement parameter may not be set, or the enhancement parameter with weak enhancement effect may be set.

In this way, the UE may actively set the compensation condition for applying the enhancement parameter according to its own reception condition, which improve initiative of the UE in selection of applying the enhancement parameter, thus improving the success rate of receiving the downlink transmission, reducing retransmissions due to the reception failures, and further improving the utilization efficiency of the transmission resources.

In an embodiment, the method further include:

receiving at least one of the enhancement parameter and a request for enhancing the downlink transmission with the enhancement parameter;

transmitting indication information on whether to enhance the downlink transmission with the enhancement parameter in response to at least one of the enhancement parameter and the request.

The UE may configure its own air-interface radio resource configuration, and the first base station may send at least one of the enhancement parameter and the request for enhancing the downlink transmission with the enhancement parameter to the UE. The UE may determine whether to enhance downlink transmission with the enhancement parameter to its own signal reception situation, and send an indication on whether to enhance the downlink transmission with the enhancement parameter.

After receiving the instruction information, the base station may enhance the downlink transmission with the enhancement parameter according to the instruction information, or do not enhance the downlink transmission.

In an embodiment, the enhancement parameter may include at least one of a power boosting parameter and a repetition transmission parameter.

The power boosting parameter may be a resource configuration of power boosting. The base station may improve a power of a signal by applying the resource configuration of power boosting, thus improving the strength of the signal received by the predetermined type of UE. Requirements of the predetermined type of UE for the signal strength are satisfied. The success rate of receiving the downlink transmission for the predetermined type of UE is improved.

The repetition transmission parameter may be a resource configuration of repetition. The base station may repeat the downlink transmission to achieve power accumulation. The UE may combine and decode repeatedly received data to improve the success rate of data decoding. The success rate of receiving the downlink transmission for the predetermined type of UE is improved.

In an embodiment, the power boosting parameter may include a power boosting level. The repetition transmission parameter may include a repetition transmission level.

Here, the power boosting parameter may be the power boosting level.

Different power boosting resource configurations are configured for different power boosting levels. Using the power boosting level may simplify setting of the enhancement parameter and improve a setting efficiency. The power boosting level may be expressed in a form of x dB.

The repetition transmission parameter may be the repetition transmission level. Different repetition transmission resource configurations are configured for different repetition transmission levels. Using the repetition transmission parameters may simplify the setting of the enhancement parameter and improve the setting efficiency.

In an embodiment, the reception capacity information may include antenna number information of the UE.

Here, the reception capacity information may be the antenna number information of the UE. The base station determines whether the UE is the predetermined type of UE according to the antenna number information of the UE, and then determines whether to apply the enhancement parameter.

The following provides a specific example in combination with any of the above embodiments.

5G NR Redcap UE may report a clear single reception antenna capability for a single reception (1Rx) antenna.

UE may report a single reception capability and a mobility capability.

A base station of original cell is configured with cell edge enhancement, and a base station of a target cell is enhanced after handover is occurred.

The original cell transmits an enhancement parameter to the target cell. The transmitted content may include specific parameters of power boosting and repetition or quantized enhancement level. The enhancement level is expressed as x dB.

In addition to the transmission capability information, the UE may also add auxiliary information to be transmitted as: requesting coverage compensation at a cell edge, including various situations of non-handover and handover, such as a handover scenario.

Based on the capability of the UE, the base station may determine the single reception capability, take Mobility as a reference, and comprehensively determine combined with the auxiliary information reported by the UE for compensation. The more conditions, the greater a probability of the compensation.

Based on the above, after the handover, the target base station may perform power compensation according to the compensation requirements in a case of RACH-Less handover. A compensation value is calculated by referring to a value of the original cell and a coverage difference between two cells.

When handover of random access is to be initiated, the UE may report a single reception capability, a mobility capability, and auxiliary information. The base station may provide compensation in a region to be compensated.

Figure 7:
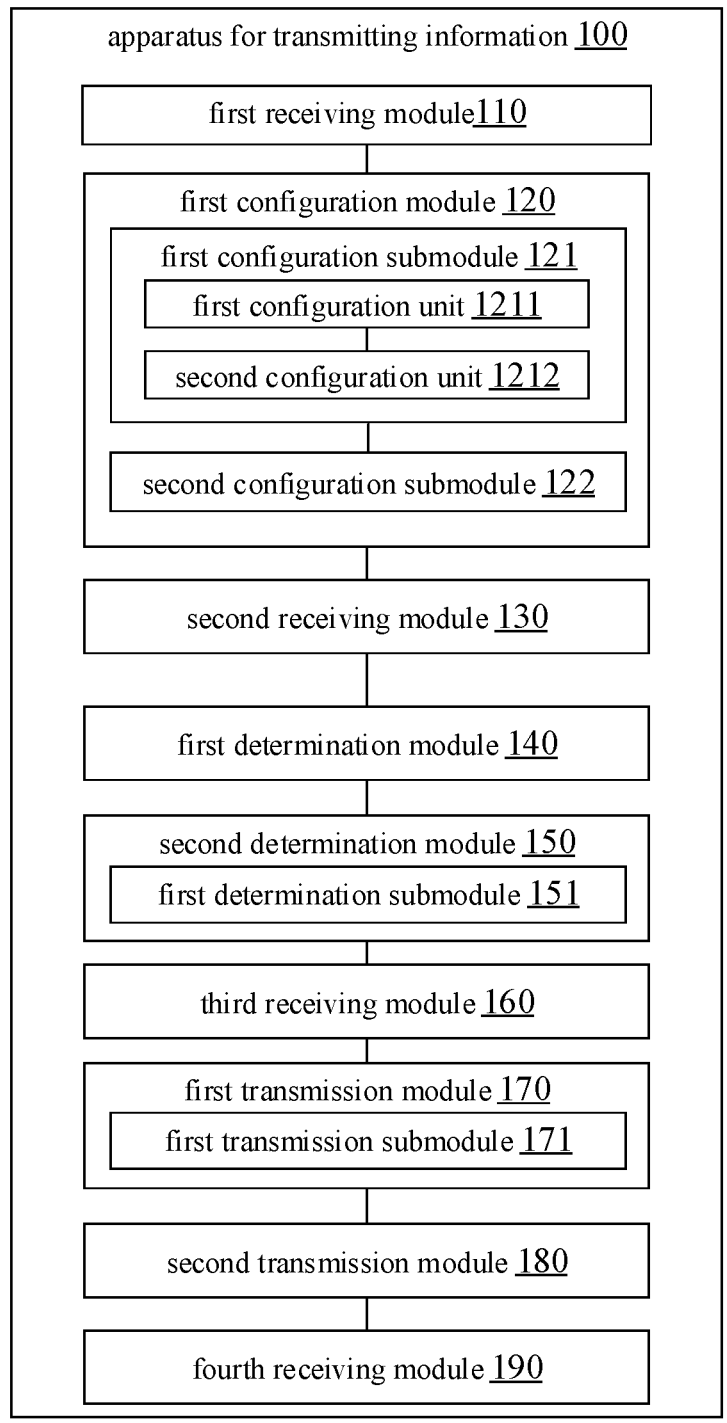
FIG. 7 is a block diagram illustrating a base station for transmitting information according to an illustrative embodiment.

An embodiment of the present disclosure also provides an apparatus for transmitting information, applicable for a first base station of wireless communication. As illustrated in FIG. 7, the apparatus 100 may include a first receiving module 110 and a first configuration module 120.

The first receiving module 110 is configured to receive reception capacity information reported by a user equipment (UE).

The first configuration module 120 is configured to determine that the UE is a predetermined type of UE having a reception capacity lower than a capacity threshold according to the reception capacity information, and configure an enhancement parameter for the predetermined type of UE, wherein the enhancement parameter is configured to enhance downlink transmission transmitted to the UE.

In an embodiment, the first configuration module 120 may include:

a first configuration submodule 121, configured to configure the enhancement parameter for the predetermined type of UE based on mobility information of the UE.

In an embodiment, the apparatus 100 may include at least one of:

a second receiving module 130, configured to receive the mobility information reported by the UE.

a first determination module 140, configured to determine the mobility information based on preset uplink information of the UE.

In an embodiment, the first configuration submodule 121 may include:

a first configuration unit 1211, configured to configure a first enhancement parameter for the predetermined type of UE, in response to the mobility information indicating that the predetermined type of UE has a first mobility;

or, a second configuration unit 1212, configured to configure a second enhancement parameter for the predetermined type of UE in response to the mobility information indicating that the predetermined type of UE has a second mobility.

The first mobility is greater than the second mobility, and a transmission gain of the downlink transmission configured based on the first enhancement parameter is greater than a transmission gain of the downlink transmission configured based on the second enhancement parameter.

In an embodiment, the apparatus 100 may further include:

a second determination module 150, configured to determine a compensation condition for enhancing the downlink transmission transmitted to the predetermined type of UE using the enhancement parameter.

The compensation condition may include at least one of the following conditions: a region compensation condition, a channel compensation condition, and a mobility compensation condition. The region compensation condition may include at least one of a compensation region in which the enhancement parameter is applied. The channel compensation condition may include a channel type to which the enhancement parameter is applied and a channel quality to which the enhancement parameter is applied. The mobility compensation condition may include a mobility type to which the enhancement parameter is applied.

In an embodiment, the apparatus 100 may further include:

a third receiving module 160, configured to receive auxiliary information reported by the UE.

The second determination module 150 includes:

a first determination submodule 151, configured to determine the compensation condition according to the auxiliary information.

In an embodiment, the first configuration module 120 includes:

a second configuration submodule 122, configured to determine that the UE is the predetermined type of UE according to the reception capacity information, and configure for the predetermined type of UE, the enhancement parameter for the downlink transmission of the predetermined type of UE in the compensation region.

In an embodiment, the compensation region includes a cell edge region.

In an embodiment, the apparatus 100 may further include:

a first transmission module 170, configured to transmit an enhancement parameter configured in a current serving cell to a second base station of a target cell in response to handover of the predetermined type of UE from the current serving cell to the target cell.

In an embodiment, the first transmission module 170 includes:

a first transmission submodule 171, configured to transmit the enhancement parameter configured in the current serving cell to the second base station of the target cell in response to the handover of the predetermined type of UE from the current serving cell to the target cell through non-random access RACH-Less.

In an embodiment, the apparatus 100 may further include:

a second transmission module 180, configured to transmit at least one of the enhancement parameter and a request for enhancing the downlink transmission with the enhancement parameter to the predetermined type of UE;

a fourth receiving module 190, configured to receive indication information transmitted by the predetermined type of UE in response to at least one of the enhancement parameter and the request. The indication information indicates whether to enhance the downlink transmission with the enhancement parameter.

In an embodiment, the enhancement parameter may include at least one of a power boosting parameter and a repetition transmission parameter.

In an embodiment, the power boosting parameter may include a power boosting level. The repetition transmission parameter may include a repetition transmission level.

In an embodiment, the reception capacity information may include antenna number information of the UE.

Figure 8:
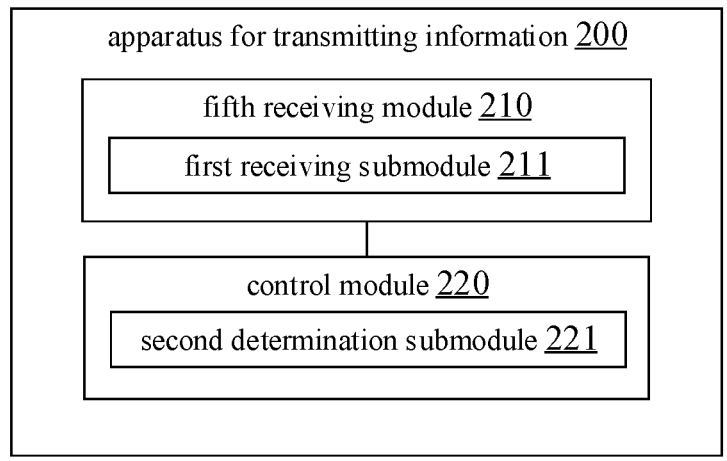
FIG. 8 is a block diagram illustrating another base station for transmitting information according to an illustrative embodiment.

An embodiment of the present disclosure also provides an apparatus for transmitting information, applicable for a second base station of wireless communication. As illustrated in FIG. 8, the apparatus 200 may include a fifth receiving module 210 and a control module 220.

The fifth receiving module 210 is configured to receive an enhancement parameter transmitted by a first base station in response to handover of a user equipment (UE) from the first base station to the second base station.

The control module 220 is configured to enhance downlink transmission transmitted to the UE according to the enhancement parameter.

In an embodiment, the fifth receiving module 210 includes:

a first receiving submodule 211, configured to receive the enhancement parameter transmitted by the first base station in response to the handover of the UE from the first base station to the second base station through non-random access (RACH-Less).

In an embodiment, the control module 220 may include:

a second determination submodule 221, configured to determine a target enhancement parameter based on the enhancement parameter, according to a difference in signal coverage between the first base station and the second base station;

a control sub-module, configured to enhance the downlink transmission transmitted to the UE according to the target enhancement parameter.

In an embodiment, the enhancement parameter may include a power boosting parameter and/or a repetition transmission parameter.

In an embodiment, the power boosting parameter may include a power boosting level. The repetition transmission parameter may include a repetition transmission level.

In an embodiment, the reception capacity information may include antenna number information of the UE.

Figure 9:
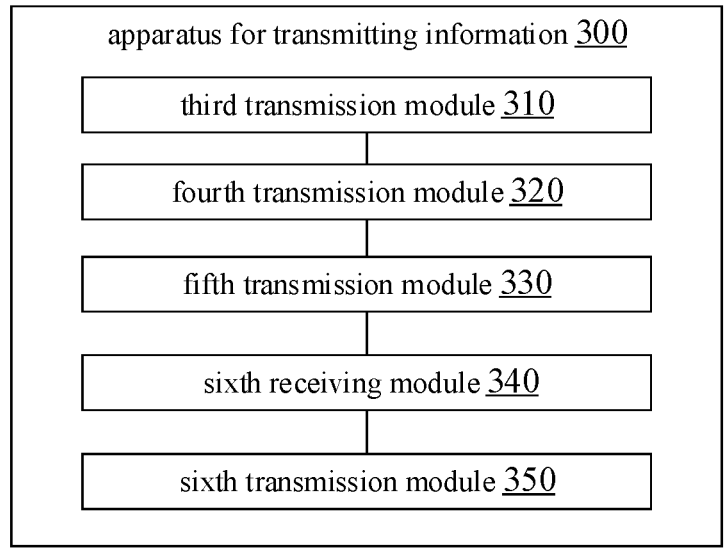
FIG. 9 is a block diagram illustrating a UE apparatus for transmitting information according to an illustrative embodiment.

An embodiment of the present disclosure also provides an apparatus for transmitting information, applicable for a UE of wireless communication. As illustrated in FIG. 9, the apparatus 300 may include a third transmission module 310.

The third transmission module 310 is configured to report reception capacity information to a first base station, in which the reception capacity information is configured for the first base station to configure an enhancement parameter for the UE, the enhancement parameter is configured for the first base station to enhance downlink transmission transmitted to the UE.

In an embodiment, the apparatus 300 may further include:

a fourth transmission module 320, configured to report mobility information to the first base station, or preset uplink information sent to the first base station. The preset uplink information is used by the first base station to determine the mobility information. The mobility information is used by the first base station to configure the enhancement parameter for UE in combination with the reception capacity information.

In an embodiment, the apparatus 300 may further include:

a fifth transmission module 330, configured to report auxiliary information to the first base station, wherein the auxiliary information is configured for the first base station to determine a compensation condition for enhancing the downlink transmission transmitted to the UE with the enhancement parameter.

In an embodiment, the apparatus 300 may further include:

a sixth receiving module 340, configured to receive the enhancement parameter and/or a request for enhancing the downlink transmission with the enhancement parameter;

a sixth transmission module 350, configured to transmit indication information on whether to enhance the downlink transmission with the enhancement parameter in response to the enhancement parameter and/or the request.

In an embodiment, the enhancement parameter may include a power boosting parameter and/or a repetition transmission parameter.

In an embodiment, the power boosting parameter may include a power boosting level. The repetition transmission parameter may include a repetition transmission level.

In an embodiment, the reception capacity information may include antenna number information of the UE.

In an illustrative embodiment, the first receiving module 110, the first configuration module 120, the second receiving module 130, the first determination module 140, the second determination module 150, the third receiving module 160, the first transmission module 170, the second transmission module 180, the fourth receiving module 190, the fifth receiving module 210, the control module 220, the third transmission module 31, the fourth transmission module 320, the fifth transmission module 330, the sixth receiving module 340 and the sixth transmission module 350 may be implemented by one or more of a central processing unit (CPU), a graphics processing unit (GPU), a baseband processor (BP), an application specific integrated circuit (ASICs), a DSP, a programmable logic device (PLD), a complex programmable logic device (CPLD), a field programmable gate array (FPGA), a general processor, a controller, a micro controller unit (MCU), a microprocessor, or other electronic components, to implement the above methods.

Figure 10:
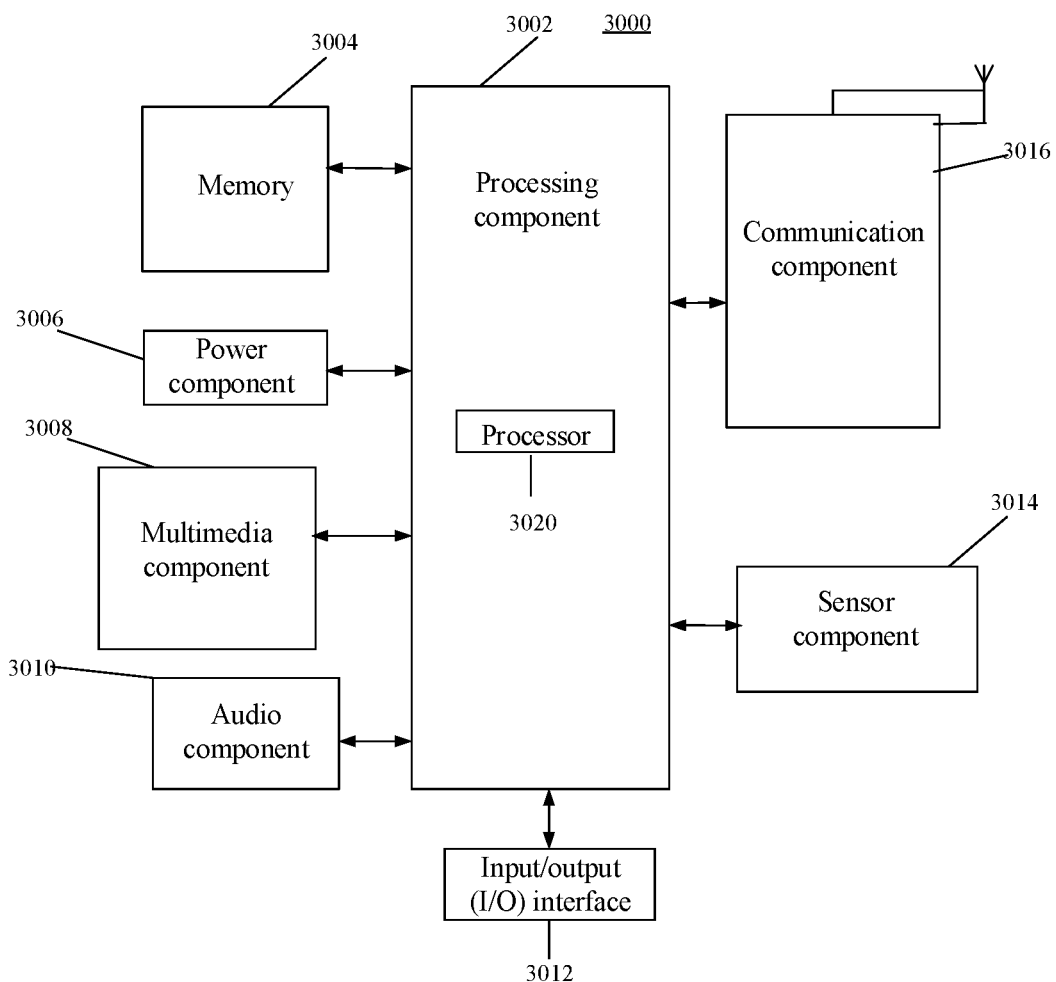
FIG. 10 is a block diagram illustrating an apparatus configured to transmit information according to an illustrative embodiment.

FIG. 10 is a block diagram illustrating an apparatus 3000 configured for transmitting information according to an illustrative embodiment. For example, the apparatus 3000 may be a user equipment such as a mobile phone, a computer, a digital broadcasting terminal, a message transceiving equipment, a game console, a tablet equipment, a medical equipment, a fitness equipment, or a personal digital assistant.

As illustrated in FIG. 10, the apparatus 3000 may include one or more of: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processing components 3002 for executing instructions to implement all or a part of the above method. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any application or method operated on the apparatus 3000 for performing contraction data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 3006 is configured to provide power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3008 includes a front camera and/or a rear camera. When the apparatus 3000 is in an operation mode, such as a shooting mode or a video mode, the front camera and/or the rear camera may receive external multimedia data. Each front camera and rear camera may be a fixed optical lens system or have a focal length and an optical zoom capability.

The audio component 3010 is configured to output and/or input an audio signal. For example, the audio component 3010 includes a microphone ("MIC") for receiving an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker for outputting the audio signal.

The I/O interface 3012 is configured to provide an interface between the processing component 3002 and peripheral interface modules, such as a keyboard, a click wheel, buttons, and the like. These buttons may include, but be not limited to, a home button, a volume button, a start button, and a lock button.

The sensor component 3014 includes one or more sensors for providing status assessments of various aspects of the apparatus 3000. For example, the sensor component 3014 may detect an open/closed state of the apparatus 3000, relative positioning of components, e.g., the display and the keypad of the apparatus 3000, a position change of the apparatus 3000 or a component of the apparatus 3000, a presence or absence of user contraction with the apparatus 3000, an orientation or an acceleration/deceleration of the apparatus 3000, and a temperature change of the apparatus 3000. The sensor component 3014 may include a proximity sensor configured to detect the presence of nearby objects without any physical contact. The sensor component 3014 may also include an optical sensor, such as a CMOS or CCD image sensor, for use in an imaging application. In some embodiments, the sensor component 3014 may also include an acceleration sensor, a gyro sensor, a magnetic sensor, a pressure sensor or a temperature sensor.

The communication component 3016 is configured to facilitate communication, wired or wirelessly, between the apparatus 3000 and other devices. The apparatus 3000 may access a wireless network based on a communication standard, such as Wi-Fi, 30G, 3G, or a combination thereof. In an illustrative embodiment, the communication component 3016 receives a broadcast signal or broadcast associated information from an external broadcast management system via a broadcast channel. In an illustrative embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more illustrative embodiments, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an illustrative embodiment, there is also provided a non-transitory computer readable storage medium including instructions, such as the memory 3004 including the instructions. The instructions may be executed by the processor 3020 in the apparatus 3000 for performing the above method. For example, the non-transitory computer readable storage medium may be a ROM, a RAM, a CD-ROM, a magnetic tape, a floppy disc, an optical data storage device, and the like.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for transmitting information, applicable for a first base station, and comprising:
receiving reception capacity information reported by a user equipment (UE); and
determining that the UE is a predetermined type of UE having a reception capacity lower than a capacity threshold according to the reception capacity information, and configuring an enhancement parameter for the predetermined type of UE, wherein the enhancement parameter is configured to enhance downlink transmission transmitted to the UE;

wherein configuring the enhancement parameter for the predetermined type of UE comprises:
receiving mobility information reported by the UE, and configuring the enhancement parameter for the predetermined type of UE based on mobility information of the UE, wherein the mobility information comprises at least one of mobile speed information, a mobile range and a mobile frequency of the UE.

2. The method according to claim 1, wherein configuring the enhancement parameter or the predetermined type of UE based on the mobility information of the UE comprises:
in response to the mobility information indicating that the predetermined type of UE has a first mobility, configuring a first enhancement parameter for the predetermined type of UE;
or, in response to the mobility information indicating that the predetermined type of UE has a second mobility, configuring a second enhancement parameter for the predetermined type of UE;
wherein, the first mobility is greater than the second mobility, and a transmission gain of the downlink transmission configured based on the first enhancement parameter is greater than a transmission gain of the downlink transmission configured based on the second enhancement parameter.

3. The method according to claim 1, further comprising:
determining a compensation condition for enhancing the downlink transmission transmitted to the predetermined type of UE using the enhancement parameter;
wherein the compensation condition comprises at least one of the following conditions: a region compensation condition, a channel compensation condition, and a mobility compensation condition;
the region compensation condition comprises a compensation region in which the enhancement parameter is applied;
the channel compensation condition comprises at least one of a channel type to which the enhancement parameter is applied and a channel quality to which the enhancement parameter is applied;
the mobility compensation condition comprises a mobility type to which the enhancement parameter is applied.

4. The method according to claim 3, further comprising:
receiving auxiliary information reported by the UE;
wherein determining the compensation condition for enhancing the downlink transmission transmitted to the predetermined type of UE using the enhancement parameter comprises:
determining the compensation condition according to the auxiliary information.

5. The method according to claim 3, wherein determining that the UE is the predetermined type of UE having the reception capacity lower than the capacity threshold according to the reception capacity information, and configuring the enhancement parameter for the predetermined type of UE comprises:
determining that the UE is the predetermined type of UE according to the reception capacity information, and configuring for the predetermined type of UE, the enhancement parameter for the downlink transmission of the predetermined type of UE in the compensation region.

6. The method according to claim 5, wherein the compensation region comprises a cell edge region.

7. The method according to claim 1, further comprising:
transmitting an enhancement parameter configured in a current serving cell to a second base station of a target cell in response to handover of the predetermined type of UE from the current serving cell to the target cell.

8. The method according to claim 7, wherein transmitting the enhancement parameter configured in the current serving cell to the second base station of the target cell in response to the handover of the predetermined type of UE from the current serving cell to the target cell comprises:
transmitting the enhancement parameter configured in the current serving cell to the second base station of the target cell in response to the handover of the predetermined type of UE from the current serving cell to the target cell through non-random access RACH-Less.

9. The method according to claim 1, further comprising:
transmitting at least one of the enhancement parameter and a request for enhancing the downlink transmission with the enhancement parameter to the predetermined type of UE;
receiving indication information transmitted by the predetermined type of UE in response to at least one of the enhancement parameter and the request, wherein the indication information indicates whether to enhance the downlink transmission with the enhancement parameter.

10. The method according to claim 1, wherein the enhancement parameter comprises at least one of a power boosting parameter and a repetition transmission parameter.

11. The method according to claim 10, wherein,
the power boosting parameter comprises a power boosting level;
the repetition transmission parameter comprises a repetition transmission level.

12. The method according to claim 1, wherein the reception capacity information comprises antenna number information of the UE.

13. A method for transmitting information, applicable for a second base station, and comprising:
receiving an enhancement parameter transmitted by a first base station in response to handover of a user equipment (UE) from the first base station to the second base station; and
enhancing downlink transmission transmitted to the UE according to the enhancement parameter;
wherein the enhancement parameter is configured by the first base station for a predetermined type of UE based on mobility information reported by the UE, wherein the mobility information comprises at least one of mobile speed information, a mobile range and a mobile frequency of the UE.

14. The method according to claim 13, wherein receiving the enhancement parameter which is transmitted by the first base station in response to the handover of the user equipment (UE) from the first base station to the second base station comprises:
receiving the enhancement parameter transmitted by the first base station in response to the handover of the UE from the first base station to the second base station through non-random access (RACH-Less).

15. The method according to claim 13, wherein enhancing the downlink transmission transmitted to the UE according to the enhancement parameter comprises:
determining a target enhancement parameter based on the enhancement parameter, according to a difference in signal coverage between the first base station and the second base station; and
enhancing the downlink transmission transmitted to the UE according to the target enhancement parameter.

16. The method according to claim 13, wherein the enhancement parameter comprises at least one of a power boosting parameter and a repetition transmission parameter.

17. The method according to claim 16, wherein,
the power boosting parameter comprises a power boosting level;
the repetition transmission parameter comprises a repetition transmission level.

18. A method for transmitting information, applicable for a user equipment (UE), and comprising:
reporting reception capacity information to a first base station, wherein the reception capacity information is configured for the first base station to configure an enhancement parameter for the UE, the enhancement parameter is configured for the first base station to enhance downlink transmission transmitted to the UE;
reporting mobility information to the first base station, wherein the mobility information is used for the first base station to configure the enhancement parameter for a predetermined type of UE, wherein the mobility information comprises at least one of mobile speed information, a mobile range and a mobile frequency of the UE.

19. The method according to claim 18, further comprising:
reporting auxiliary information to the first base station, wherein the auxiliary information is configured for the first base station to determine a compensation condition for enhancing the downlink transmission transmitted to the UE with the enhancement parameter.

* * * * *